United States Patent [19]

Oouchi

[11] Patent Number: 5,282,203
[45] Date of Patent: Jan. 25, 1994

[54] METHOD OF AND SYSTEM FOR CONTROLLING PACKET-RATE IN COMMUNICATION NETWORK

[75] Inventor: Toshiya Oouchi, Kokubunji, Japan

[73] Assignee: Hitachi, Ltd., Tokyo, Japan

[21] Appl. No.: 834,351

[22] Filed: Feb. 12, 1992

[30] Foreign Application Priority Data

Feb. 12, 1991 [JP] Japan .................. 3-018588

[51] Int. Cl.$^5$ .............. H04L 12/24; H04L 12/56
[52] U.S. Cl. ........................................ 370/94.1
[58] Field of Search ................. 370/60, 601., 94.1, 370/94.2, 110.1, 13, 17

[56] References Cited

U.S. PATENT DOCUMENTS

| 4,993,024 | 2/1991 | Quinquis et al. | 370/94.1 |
| 5,007,043 | 4/1991 | van den Dool et al. | 370/94.1 |
| 5,132,961 | 7/1992 | Thiebaut et al. | 370/94.1 |
| 5,140,588 | 8/1992 | Danner | 370/94.1 |

FOREIGN PATENT DOCUMENTS 0275678 7/1988 European Pat. Off. .
0384758 8/1990 European Pat. Off. .

OTHER PUBLICATIONS

C. Cooper et al, "Toward a Broadband Congestion Control Strategy", IEEE Network Mag., vol. 4, No. 3, pp. 18-23.

Primary Examiner—Wellington Chin
Attorney, Agent, or Firm—Antonelli, Terry, Stout & Kraus

[57] ABSTRACT

There is provided a packet-rate control method for a packet network, in which a declaration of parameters indicating the rate of fixed-length packets is so made to a call control system by a subscriber terminal device prior to communication as to be associated with a logical channel number. The rate of packets inputted to the network is so measured as to be associated with a logical channel number. While the degree of violation is low, packets transmitted in violation of user-declaring parameters are provided with a violation mark and taken in the network. If the degree of violation is high, the packets transmitted in violation of user-declaring parameters are discarded on the input side of the network. When there appears a possibility of congestion in the network, the marked packets are discarded. As a result, it is possible to prevent violation packets and marked packets from affecting the quality of service using normal packets.

8 Claims, 7 Drawing Sheets

METHOD OF AND SYSTEM FOR CONTROLLING PACKET-RATE IN COMMUNICATION NETWORK

BACKGROUND OF THE INVENTION

1. Field of the Invention

The present invention relates to a method of and an apparatus for packet-rate control of arrival packets in packet networks, and in particular to rate control intended for packets (violation packets) transmitted excessively from a subscriber terminal device in violation of a contract closed between a network provider and a subscriber or user in packet networks using an ATM (Asynchronous Transfer Mode).

2. Description of the Related Art

As a promising communication method of the next generation, ATM networks for transferring information in the form of fixed-length packets (hereafter referred to simply as "cells") are now being studied in various research institutions. In ATM networks, communication of information (such as speech, image or data) generated from various kinds of media and having various transfer speeds is performed.

In general, there is a limit in communication capacity which can be provided by a network. When a terminal device requests a call, therefore, the network provider makes the subscriber (or the terminal device) declare parameters such as bit rate and determines whether the quantity of cells passing through the network exceeds the communication capacity as a result of cells newly generated when that call request is admitted. If the quantity of the cells passing through the network is judged not to exceed the communication capacity, the above described call request is admitted. If the subscriber transmits cells excessively in violation of the user-declaring parameters, however, the quantity of cells passing through the network exceeds the communication capacity, resulting in degradation of quality of service such as loss of some cells caused by discarding excess cells or an increase of delay time in cell transfer and exchange.

In ATM networks, a plurality of subscribers performs communication by sharing the same resources (such as transfer nodes and links). If some subscriber transmits a large number of cells in violation of user-declaring parameters, therefore, it influences other subscribers which do not violate user-declaring parameters as degradation in quality of service. Therefore, it becomes necessary to exercise packet-rate control for regulating cells transmitted in violation of user-declaring parameters (hereafter referred to as "violation cells".)

As the above described packet-rate control method for violation packets, there are heretofore known (1) a method of discarding all violation cells, and (2) a method of adding a special mark indicating violation to violation cells and discarding cells having the above described mark added thereto (hereafter referred to as "marked cells") when congestion has occurred in the network. These packet-rate control techniques are described in Toshio Suzuki et al., "Configuration of the Broadband Subscriber Interface Unit", The Institute of Electronics, Information and Communication Engineers Technical Report SSE89-148, pp. 13–18 for example.

In the conventional method (1) of discarding all violation cells, however, violation cells are immediately discarded even if the quantity of cells passing through the network is sufficiently smaller than the communication capacity. In such a period that there is a margin of communication capacity, communication resources are not used efficiently, resulting in a problem.

In the conventional method (2) of discarding marked cells, violation cells are received in the network without any restriction, and regulation for marked cells is not performed unless congestion has actually occurred. In case a large quantity of violation cells are sent into the network as a result of disorders in some subscriber terminals, for example, therefore, congestion is generated in the network by these violation cells (marked cells) and a bad influence is exerted upon the quality of service of other subscribers maintaining communication while obeying the user-declared parameters, resulting in a problem.

In these conventional control methods, means for notifying the subscriber of terminal disorder is not provided. Until the subscriber notices the terminal disorder by itself, therefore, the disordered terminal continues to transmit violation cells for a relatively long term, resulting in a problem.

SUMMARY OF THE INVENTION

An object of the present invention is to provide a method of and a system for exercising cell-rate control so as to suppress congestion caused by violation cells in a packet network and assure of quality of service of normal cells.

Another object of the present invention is to provide a method of and a system for exercising cell-rate control so as to effectively use resources in the network while there is a margin of communication capacity.

In order to achieve these objects, a cell-rate control apparatus of the present invention includes means for storing, in association with a logic channel number, parameters indicating the packet rate of transmitted packets declared to the network by the subscriber terminal device prior to communication with the device of the other party, means for monitoring the rate of arrival packets in association with a logical channel number and for detecting packets arriving with a rate exceeding a first threshold value determined by the above described user-declaring parameters, means for adding a predetermined mark to the above described packets which have arrived with the rate exceeding the first threshold value, and means for discarding at least part of packets which have arrived with a rate exceeding a second threshold value larger than the above described first threshold value.

That is to say, in a packet network, in which declaration of the rate of transmitted packets is so made to a call control system by a subscriber terminal device as to be associated with a logical channel number prior to communication, the cell arrival rate to the network may be so monitored as to be associated with a logical channel number. The cell-rate control of the present invention may provide that the rate of cell arrival to the network is so monitored as to be associated with a logical channel number. The degree of violation of user-declared parameters is judged. And regulation for violation cells is enforced by using a regulation method depending upon the degree of violation.

This will now be described more concretely. For example, if the degree of violation is low (i.e., if the cell rate exceeds a first threshold value depending upon the user-declared parameters), these violation cells are received into the network in the form of marked cells having violation-indicating marks. If the degree of violation is high (i.e., if the cell rate exceeds a second threshold value which is higher than the above described first threshold value), then the terminal device transmitting the violation cells is judged to be disordered and at least part of violation cells transmitted from that terminal and arriving at the network are discarded at the entrance to the network.

In accordance with one aspect of the present invention, the frequency of disorder exceeding the above described second threshold value is so measured as to be associated with a logical channel number, and if the disorder frequency is high (i.e., if the number of times of occurrence of disorder or the frequency of disorder exceeds a predetermined threshold value), then all cells associated with that logical channel number are discarded at the entrance to the network.

In accordance with another aspect of the present invention, a packet-rate control apparatus notifies a network controller of occurrence of a disorder in a terminal device and the network controller transmits a control signal for disorder notification and cell transmission suppression to the above described terminal device judged to be disordered. The above described disorder notification is made when the disorder frequency exceeds a predetermined threshold value or when the cell rate exceeds the above described second threshold value, for example.

Marked cells received into the network are discarded prior to other cells when congestion has actually occurred in the network.

In the rate control of the present invention, the number of violation cells received into the network is limited when a disorder has occurred in a terminal device. Therefore, occurrence of congestion due to violation cells can be suppressed. As a result, the quality of service by using normal cells can be assured.

If the degree of violation is low as compared with user-declared parameters, part of violation cells are received into the network as marked cells. As long as there is a margin of communication capacity, therefore, resources in the network are used effectively.

When a terminal has been judged to be disordered, the subscriber is notified of occurrence of the disorder via a control system. Therefore, transmission of violation cells can be suspended and continuation of transmission of violation cells for a long time can be prevented. Meanwhile, part or all of arriving cells transmitted from the terminal device judged to be disordered are discarded. Therefore, influence of violation cells transmitted until the subscriber suspends cell transmission over the network can be lessened.

The foregoing and other objects, advantages, manner of operation and novel feature of the present invention will be understood from the following detailed description when read in conjunction with the accompanying drawings.

DESCRIPTION OF THE PREFERRED EMBODIMENTS

Figure 1:
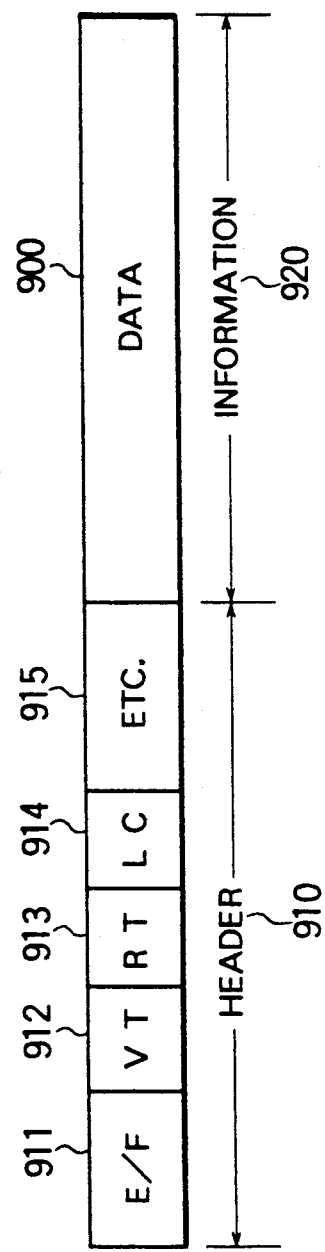
FIG. 1 is a diagram showing the configuration of a fixed-length packet (cell) which is the subject of rate control.

FIG. 1 shows the format of a fixed-length packet (cell) 900 which becomes the subject of rate control in a communication system according to the present invention. Each cell 900 includes a header section 910 and an information section (DATA) 920. The above described header section 910 includes an empty cell indication field (E/F) 911, a logical channel number indication field (LC) 914, a violation cell indication field (VT) 912, a route information field (RT) 913, and a field 915 for other control information. At the present time, the length of the above described cell 900 is standardized to 53 bytes in accordance with a recommendation of CCITT. The logical channel number (LC) 914 is so given as to be associated with a subscriber terminal and a call. That is to say, it is possible to know the subscriber terminal wherefrom the cell is transmitted on the basis of the value of the LC contained in the header.

Figure 2:
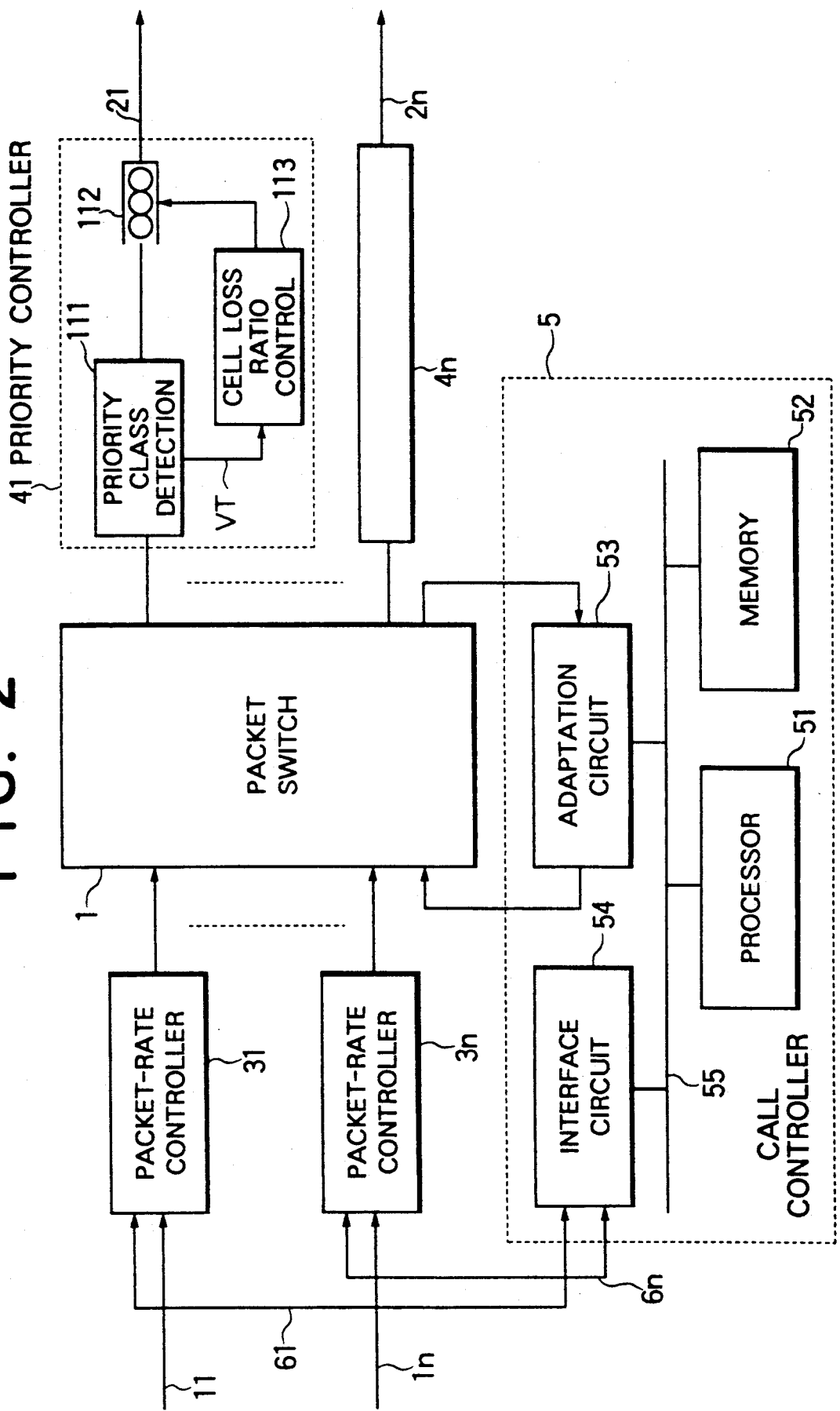
FIG. 2 is a block diagram showing an embodiment of a packet-rate control apparatus according to the present inventions.

FIG. 2 is a block diagram showing an embodiment of a packet switching system for exercising rate control according to the present invention. With reference to FIG. 2, numeral 1 denotes a packet switch, 1i (1l–1n) an input line of the switch, 2i (2l–2n) an output line, 3i (3l–3n) a packet-rate controller, 4i (4l–4n) a priority control circuit, and 5 a call controller connected to the packet switch 1.

Figure 3:
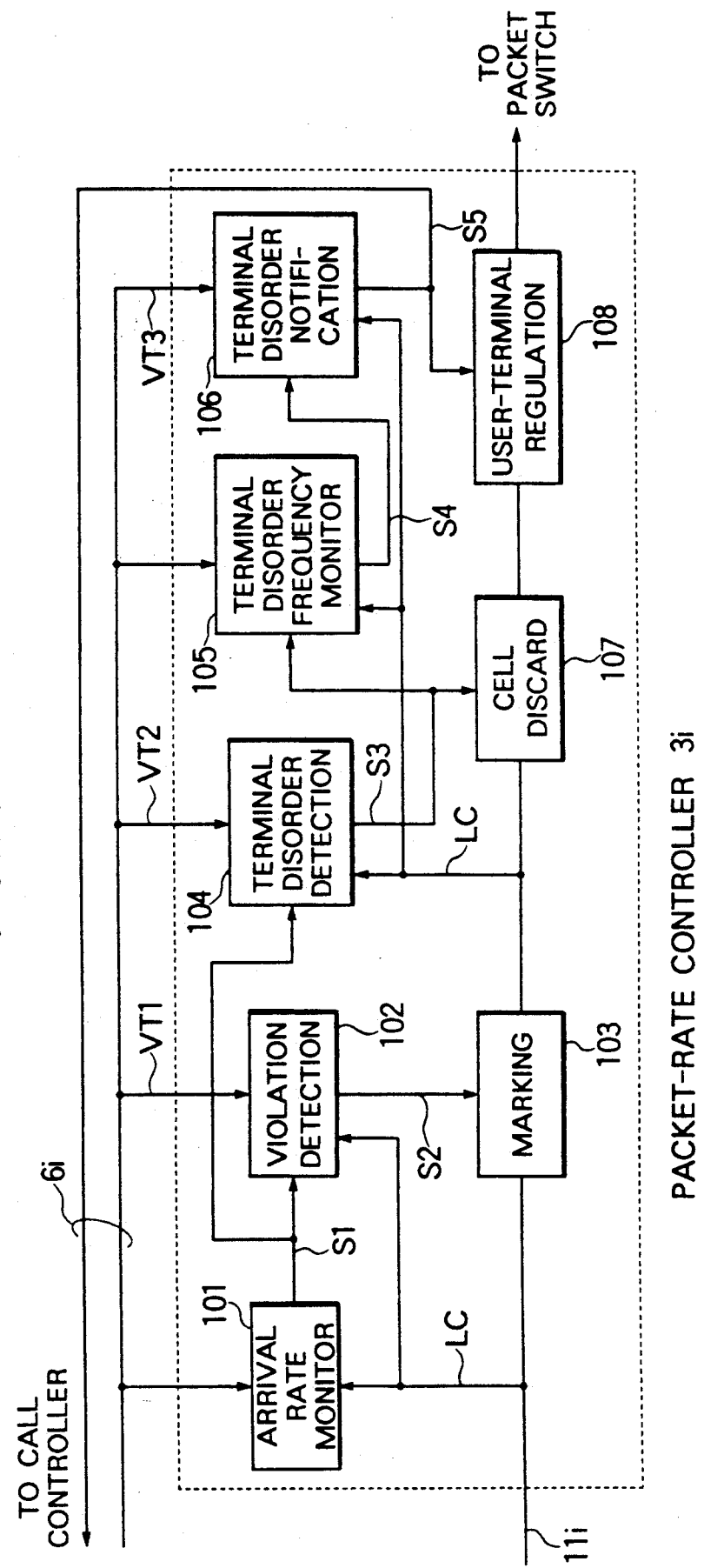
FIG. 3 is a block diagram showing the configuration of a packet rate controller 3i illustrated in FIG. 2.

As shown in FIG. 3, the packet-rate controller 3i includes an arrival rate monitoring circuit 101, a violation detection circuit 102 for detecting violation of user-declared parameters of cell transmission, a marking circuit 103 for adding an identification mark to violation cells, a terminal disorder detection circuit 104 for detecting occurrence of a terminal disorder, a cell discard circuit 107 for discarding specific input cells, a terminal disorder frequency monitoring circuit 105 for monitoring disorder frequency in association with terminal devices, a terminal disorder notification circuit 106 for notifying the call controller 5 of occurrence of a terminal disorder, and a user-terminal regulation circuit 108. Details of the operation and configuration of the packet-rate controller will be described later.

The priority control circuit 4i includes a priority class detector 111, an output buffer memory 112, and a cell loss ratio control circuit 113 for controlling the input to the above described output buffer memory 112 according to the priority class detected in the above described priority class detector.

The call controller 5 includes a data processor 51, a memory 52 for storing a control program to be executed by the above described data processor 51 and various kinds of data, an adaptation circuit 53 for assembling call control cells transmitted from the packet switch 1 to convert them into a control message, delivering the control message to the above described data processor 51, segmenting a control message transmitted from the data processor 51 into fixed-length cells, and transmitting the resultant cells to the packet switch 1, and an interface circuit (multiplexing/demultiplexing circuit) 54 connected to the packet-rate controller 3$i$ (3$l$–3$n$) via a control line 6$i$ (6$l$–6$n$), and a bus 55 connecting these elements.

In addition to the call control function, the call controller 5 has function of setting various kinds of parameters needed by the packet-rate controller 3$l$–3$n$ and function of issuing a communication suspension command to a disordered terminal.

As the parameters set in the packet-rate controller 3$l$–3$n$ by the call controller 5, there are (1) a first threshold value VT1 used by the violation detection circuit 102 to determine whether there is violation of user-declared parameters, (2) a second threshold value VT2 used by the terminal disorder detection circuit 104 to determine whether a terminal is disordered, and (3) a third threshold value VT3 used by the terminal disorder notification circuit 106 to determine whether the terminal should be notified of the disorder.

Prior to communication, each subscriber terminal declares parameters of cell transmission frequency (user-declared parameters). The message indicating the user-declared parameters is transferred to the packet switch 1 as a control packet via the input line 1$j$ and the the packet-rate controller 3$j$ and inputted to the adaptation circuit 53 by the packet switch 1. Upon receiving the above described user-declared parameters from the adaptation circuit 53, the call controller 5 decides the above described first to third threshold values on the basis of the above described user-declared parameters and sets the first to third threshold values in the pertinent packet-rate controller 3$j$ via the control signal line 6$i$.

If a terminal disorder is detected by the terminal disorder notification circuit 106 as described later, a terminal disorder notification signal S5 containing the LC associated with the disordered terminal is inputted to the call controller 5 by the packet-rate controller 3$j$ via the control line 6$j$. The data processor 51 in the call controller 5 generates a communication suspension command message addressed to the disordered terminal device indicated by the above described terminal disorder notification signal S5 and supplies the communication suspension command message thus generated to the adaptation circuit 53. The above described communication suspension command message is divided into one or a plurality of fixed-length cells by the adaptation circuit 53 and outputted to the output line 2$j$, whereto the disordered terminal is connected, by the packet switch 1.

The present embodiment may provide that the number of violation cells received into the network is limited when a terminal disorder has occurred by providing the terminal disorder detection circuit 104 and the cell discard circuit 107 in the packet-rate controller 3$i$. The present embodiment may also provide that when the disorder frequency is high for packets arriving from a certain terminal, any cells transmitted from that terminal are not received into the network and the call controller 5 is notified of occurrence of a terminal disorder by providing the terminal disorder frequency monitoring circuit 105, the terminal disorder notification circuit 106 and the user-terminal regulation circuit 108.

If a cell has arrived at the input line 1$l$–1$n$, the logical channel number LC of the cell which has arrived is extracted and inputted to the arrival rate monitoring circuit 101. When a cell has arrived, the arrival rate monitoring circuit 101 measures the cell arrival rate, i.e., cell rate in association with the LC. On the basis of a monitored value S1 measured by the above described arrival rate monitoring circuit 101 and a first threshold value VT1 determined according to the rate (transmission frequency) of transmitted cells so declared by the subscriber as to be associated with an LC, the violation detection circuit 102 detects whether there is violation of the user-declaring parameters in cell transmission. If violation of the user-declared parameters is detected, the violation detection circuit 102 supplies a command signal S2 to the marking circuit 103. In response to the command signal S2, the marking circuit 103 adds a predetermined identification mark to arrival cells. When cell congestion thereafter occurs in the network, cells having the mark added thereto (hereafter referred to as "marked cells") are handled as cells having low priority. In the priority control circuit 4$l$–4$n$ of the succeeding stage, for example, the marked cells are handled as cells to be discarded when congestion has occurred.

The terminal disorder detection circuit 104 compares the monitored value S1 measured by the arrival rate monitoring circuit 101 with a second threshold value VT2 which is determined according to the user-declared parameters and which is sufficiently larger than the first threshold value. When the monitored value exceeds the above described second threshold value VT2, the terminal disorder detection circuit 104 judges a terminal disorder to have occurred and transmits a disorder detection signal S3 to the cell discard circuit 107. In response to the above described disorder detection signal S3, the cell discard circuit 107 discards inputted cells.

Thus, in accordance with the present invention, violation cells are received into the network as marked cells while the degree of violation of the user-declared parameters is low. If the degree of violation of the user-declared parameters becomes high and a terminal disorder can be judged to have occurred, the number of marked cells received into the network is limited by discarding inputted cells. Thereby, unlimited invasion of marked cells into the network, which is a problem of the prior art, is prevented and the cause of possible congestion in the network is eliminated before it happens. While the degree of violation of the user-declared parameters is low, all of violation cells are received into the network as marked cells. In such a range that the quality of service performed by normal cells is not degraded, therefore, communication performed by the above described marked cells is assured and resources in the network are used effectively.

On the basis of the above described disorder detection signal S3 generated by the above described terminal disorder detection circuit 104, the terminal disorder frequency monitoring circuit 105 measures the frequency of terminal disorder. The terminal disorder notification circuit 106 compares a disorder frequency S4 measured by the above described terminal disorder frequency monitoring circuit 105 with a third threshold value VT3. If the disorder frequency S4 exceeds the third threshold value VT3, the terminal disorder notification circuit 106 transmits a disorder notification signal S5 containing the LC specifying the disordered terminal to the call controller 5. The notification signal S5 is also applied to the user-terminal regulation circuit 108 to order the regulation of packets inputted from the above described disordered terminal (subscriber). Upon receiving the above described user-terminal regulation signal S5, the user-terminal regulation circuit 108 discards all of cells arriving thereafter and having the logic channel number LC specified by the above described signal S5.

In response to the terminal disorder notification supplied from the above described terminal disorder notification circuit 106, the call controller 5 notifies the disordered terminal of the communication disorder and hence the disordered terminal suspends transmission of succeeding cells. Thereby it becomes possible to solve the problem of the prior art that the disordered terminal continues to transmit violation cells for a long time. Also, once the circuit 106 has judged the terminal to be disordered, the user-terminal regulation circuit 108 discards all of cells supplied from the disordered terminal and inputted to the circuit 108 thereafter. Thereby it is possible to prevent a large quantity of cells transmitted until the disordered terminal suspends the cell transmission operation from invading into the network.

Cells which have arrived at the packet switch 1 are transmitted to some output line 2k (2l-2n) specified by route information RT contained in the header of each cell. In the priority control circuit 4i provided on each output line 2l-2n, the priority class detector 111 determines whether an input cell is a marked cell. If a marked cell is inputted, the priority class detector 111 supplies a control signal VT to the cell loss ratio control circuit 113. The cell loss ratio control circuit 113 is a circuit for limiting cell input to the output buffer memory 112 during the duration of congestion. When the number of empty buffer memories of the above described buffer memory 112 becomes a predetermined value or less, the cell loss ratio control circuit 113 judges a congestion state to have occurred and discards marked cells indicated by the control signal VT to prevent them from being inputted to the buffer memory.

In each output buffer memory 112, marked cells and normal cells are stored mixedly. If the number of marked cells increases in a system of the prior art, therefore, the buffer area for storing normal cells becomes insufficient and hence part of normal cells are discarded, resulting in possibility of degraded quality of service. In the above described configuration of the present invention, marked cells are discarded by the cell loss ratio control circuit 113 before the buffer memory 113 becomes full, this problem being solved.

Figure 4:
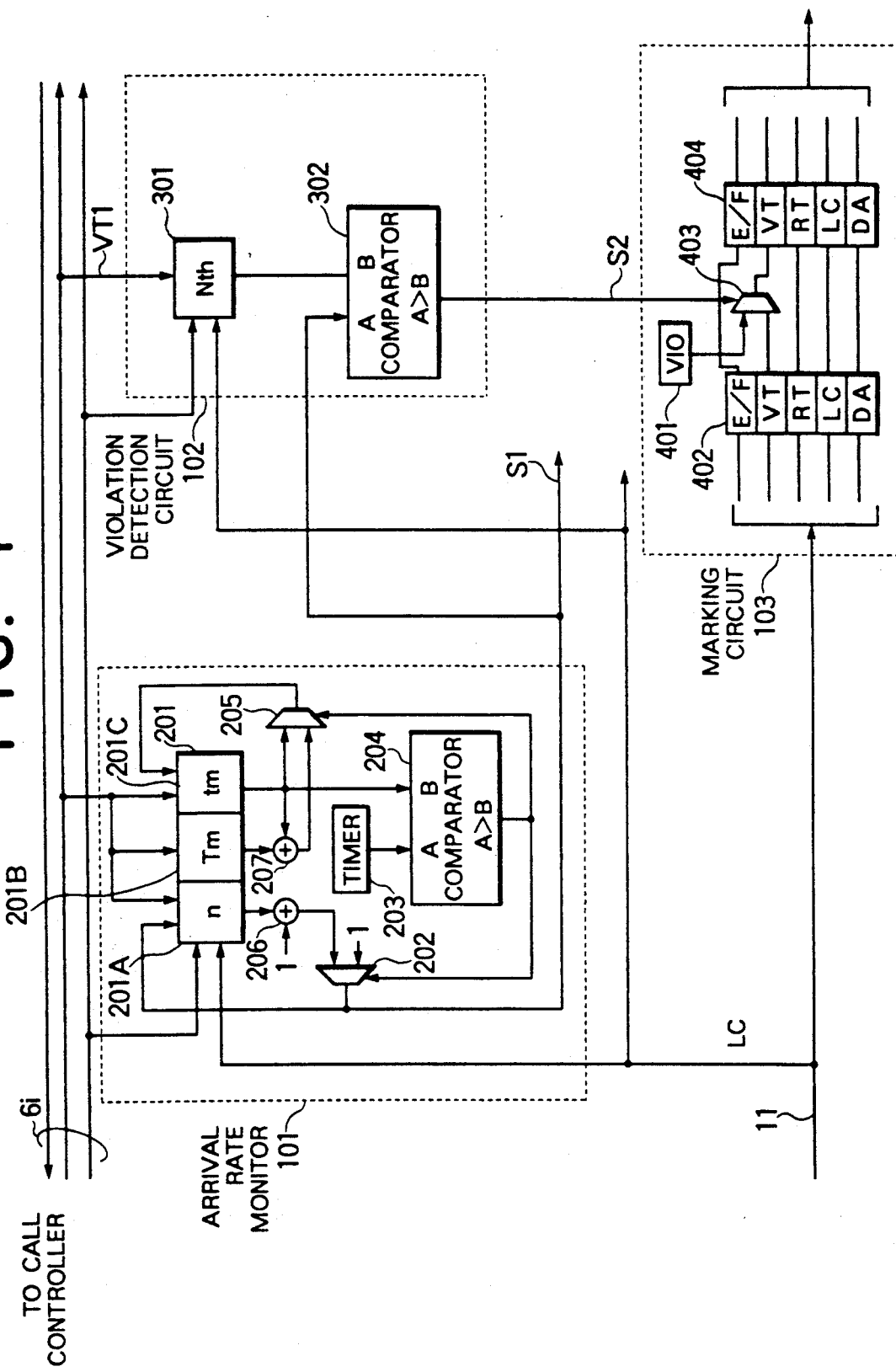
FIG. 4 is a block diagram showing details of an arrival rate monitoring circuit 101, a violation detection circuit 102 and a marking circuit 103.

By referring to FIG. 4, operation of the arrival rate monitoring circuit 101, the violation detection circuit 102 and the marking circuit 103 will now be described.

The subscriber declares the communication frequency by using the following two parameters, for example.
(1) T: time period
(2) X; maximum number of cells transmitted within the time period T.

The arrival rate monitoring circuit 101 accumulates the number of input cells in association with each LC. Each time a cell arrives, the arrival rate monitoring circuit 101 outputs the number of cells which have arrived within each monitoring period k·T (k=1,2,3,...) and LCs of those cells as the signal S1. If the number of arrival cells exceeds k·X, it is meant that the user has violated the user-declared parameters. For each LC of arrival cells, the violation detection circuit 102 compares the number of arrival cells with the threshold value k·X to detect whether there is violation of the user-declaring parameters.

In response to the signal S2 outputted when violation of the user-declaring parameters is detected by the violation detection circuit 102, the marking circuit 103 adds a specific identification mark indicating the violation to input cells. In the present embodiment, time length is represented by taking the time required for transmission of one cell on an input/output line as the unit time (ut). In case the bit rate of the input/output line is 156 Mbss, for example, the time length of one cell corresponds to $53 \times 8$ b/156 Mbs $\approx 2.72$ $\mu$s.

The arrival rate monitoring circuit 101 includes a table memory 201, selection circuits 202 and 205, a timer 203, a comparator 204, and adders 206 and 207.

In association with each LC, the table memory 201 has an area 201A for storing the number n of arrival cells, an area 201B for storing a monitoring time period Tm, and an area 201C for storing an initialization time tm. Values of a set of these parameters n, Tm and tm can be read out by using the value of LC of the arrival cell as the address.

It is now assumed that the declared value of time period is T. In order to monitor the number of arrival cells within a period kT, kT is stored in the memory area 201B for storing the monitoring time period Tm and the monitored value n is initialized every time period k·T in the present embodiment. The initialization time tm stored in the memory area 201C is updated every time period k·T as follows:

$$\text{tm (current)} = \text{tm (last)} + \text{Tm}$$

The above described update of the initialization time tm is performed by adding values of the memory areas 201B and 201C in the adder 207 and inputting the result of addition to the memory area 201C via the selection circuit 205. Transfer of the result of addition to the memory area 201C is carried out when the condition, current time $\geq$ tm, is satisfied. That is to say, the current time indicated by the timer 203 is compared in the comparator 204 with the value tm stored in the memory area 201C. When the condition, current time $\geq$ tm, is satisfied, the output (tm+Tm) of the adder 207 is selected by the selection circuit 205. In the remaining period, the value tm of the memory area 201C is selected by the selection circuit 205.

Whenever a cell arrives at the input line 11, a parameter record relating to an LC stored in the cell header is read out from the table memory 201 by using that LC as the address. The value of the number n of arrival cells read out from the memory area 201A is increased by the adder 206. The updated value (n+1) is written into the memory area 201A via the selection circuit 202. The above described selection circuit 202 is adapted to select an initial value "1" at the time of initialization when the condition, current time $\geq$ tm, is satisfied. In the memory area 201A, therefore, cells arriving within each period Tm are counted. Initial values of the above described parameters Tm, tm and n are specified by the call controller 5.

The violation detection circuit 102 includes a memory 301 and a comparator 302. The comparator 302 compares the number n of arrival cells monitored by the arrival rate monitoring circuit 101 with a threshold value k·X stored in the memory 301 and specified by the call controller 5. When the condition $n \geq k \cdot X$ is satisfied, the comparator 302 outputs a violation detection signal S2. In the memory 301, a threshold value $k \cdot X$ is stored for each LC. Whenever a cell arrives at the input line 11, a threshold value Nth associated with the LC of that arrival cell is read out and supplied to the comparator 302.

The marking circuit 103 includes two registers 402 and 403 connected in cascade to temporarily store arrival cells, a register 401 for storing the bit pattern of an identification mark indicating that the cell is a cell violating the user-declaring parameters, and a selection circuit 403. When the violation detection signal S2 is outputted from the violation detection circuit 102, the selection circuit 403 selects the output signal of the register 401, and changes the bit pattern of the violation cell indication field (VT) of the arrival cell into the bit pattern of the violation mark.

Figure 5:
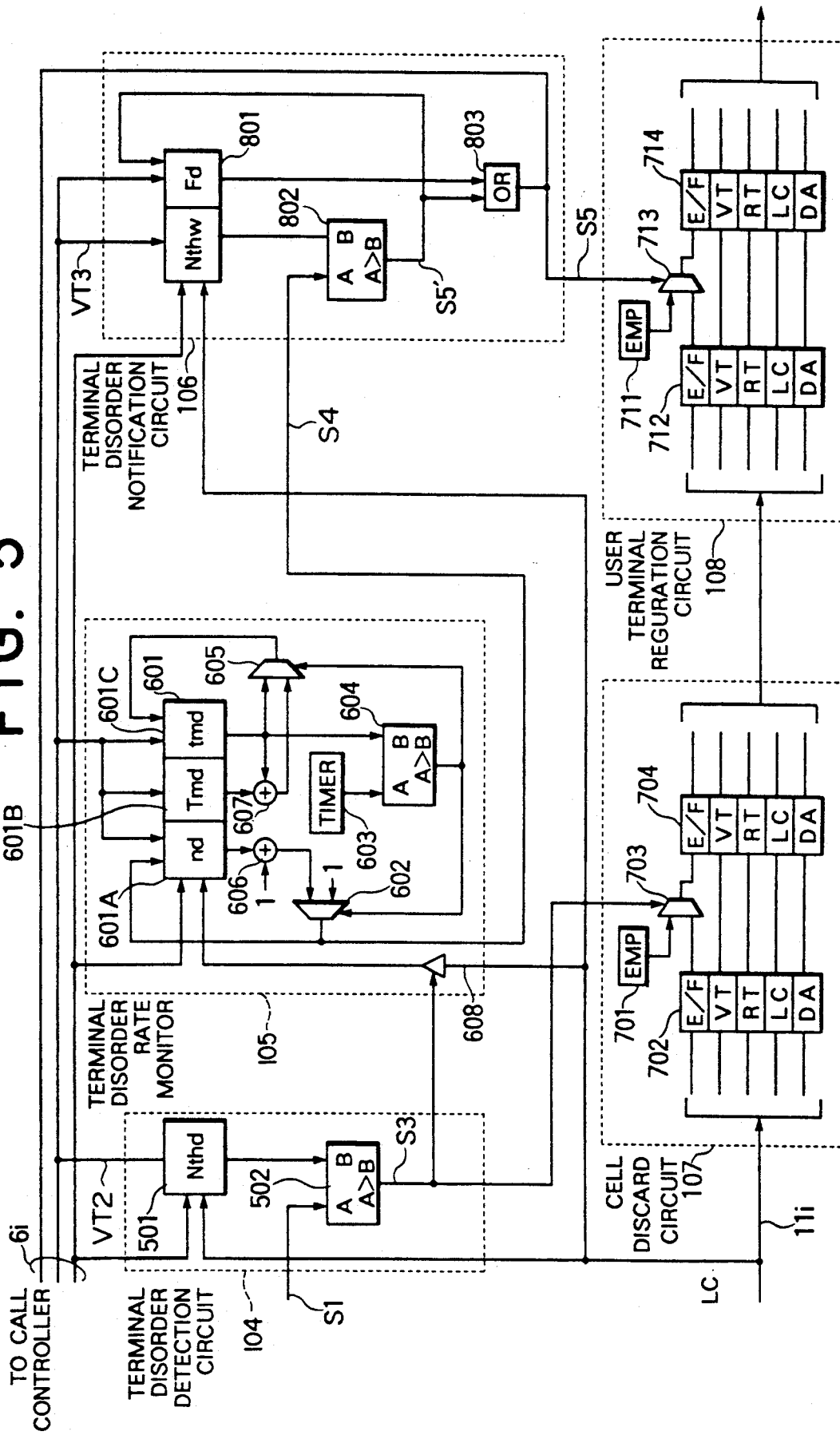
FIG. 5 is a block diagram showing details of a terminal disorder detection circuit 104, a circuit 105 for monitoring terminal disorder frequency, a terminal disorder notification circuit 106, a cell discard circuit 107 and a user-terminal regulation circuit 108.

By referring to FIG. 5, details of the terminal disorder detection circuit 104, the terminal disorder frequency monitoring circuit 105, the terminal disorder notification circuit 106, the cell discard circuit 107 and the user-terminal regulation circuit 108 shown in FIG. 3 will now be described.

On the basis of the monitored value S1 indicating the number n of cells outputted from the arrival rate monitoring circuit 101 and the second threshold value VT2, the terminal disorder detection circuit 104 detects occurrence of a terminal disorder. The terminal disorder detection circuit 104 includes a memory 501 for storing the second threshold value VT2 in a form of Nthd described below, for example, for each LC, and a comparator 502 for comparing the number n of arrival cells with a threshold value Nthd associated with the LC of the arrival cells and outputting the disorder detection signal S3 when the following expression is satisfied.

$$n \geq Nthd = m \cdot Nth = m \cdot k \cdot X \qquad (m \geq 1)$$

The above described comparison operation is conducted whenever a cell has arrived.

The cell discard circuit 107 includes two registers 702 and 704 connected in cascade to the input line 11$i$ to temporarily store cells, a register 701 for storing a bit pattern indicating that the cell is an empty cell, and a selection circuit 703. When a terminal disorder has been detected by the terminal disorder detection circuit 104, the cell discard circuit functions to discard arrival cells.

The selection circuit 703 selects the output of the register 701 if the terminal disorder detection signal signal S3 is outputted from the terminal disorder detection circuit 104. Otherwise, the selection circuit 703 selects the output of an E/F field of the register 702. When the terminal disorder detection signal S3 has been outputted, therefore, the E/F field of the arrival cell is changed into a bit pattern indicating an empty cell and the cell is discarded in the packet switch 1.

The terminal disorder frequency monitoring circuit 105 is provided to monitor, in association with each LC, the frequency of disorder detection made by the terminal disorder detection circuit 104. The terminal disorder frequency monitoring circuit 105 includes a table memory 601, selection circuits 602 and 605, a timer 603, a comparator 604, adders 606 and 607, and a gate circuit 608. The table memory 601 includes an area 601A for storing the number nd of times of terminal disorder detection for each LC, an area 601B for storing a monitoring time period Tmd, and an area 601C for storing initialization time tmd.

In order to determine whether disorders occur steadily, the number of times of disorder detection in the terminal disorder detection circuit 104 performed during the monitoring time period $Tmd = 1 \cdot Tm$ ($1 = 1, 2, 3, ...$) is monitored in the present embodiment by initialing the monitored value of the number nd of times of terminal disorder detection every time period Tmd. The initialization time tmd of the monitored value is updated every time period Tmd as represented by the following equation.

$$tmd \text{ (current)} = tmd \text{ (last)} + Tmd$$

The above described update of the initialization time tmd is performed by an update circuit including the adder 607, the selection circuit 605, the timer 603 indicating the current time, and the comparator 604. The above described update of the initialization time is performed when the condition, current time $\geq$ tmd, is satisfied. Since the operation of the update circuit is similar to that of update of the tm in the arrival rate monitoring circuit 101 shown in FIG. 4, detailed description thereof will be omitted.

Whenever a terminal disorder is detected in the detection circuit 104, the gate 608 is opened and the memory 601 is accessed by taking the LC contained in the header of the arrival cell as the address, the number nd of times of disorder detection associated with the above described LC being thus read out from the memory area 601A. The value of nd read out is increased by the adder 606, and the updated number (nd + 1) of times of detection is written into the memory area 601A. At the time of initialization, the selection circuit 602 selects the initial value "1" in response to the output signal of the comparator 604 and hence the number nd of times of violation detection becomes the count of every period Tmd.

On the basis of the value of the number nd of times of terminal disorder detection monitored in the above described terminal disorder frequency monitoring circuit 105, the terminal disorder notification circuit 106 determines whether the terminal disorder is steady or temporary. If the disorder is steady, the terminal disorder notification circuit 106 notifies occurrence of the terminal disorder of the call controller 5 and the user-terminal regulation circuit 108. Upon receiving this notification, the user-terminal regulation circuit 108 discards all cells arriving from the disordered terminal.

The terminal disorder notification circuit 106 includes a memory 801 for storing the third threshold value VT3 (=Nthw) in association with each LC and a comparator 802. The comparator 802 compares the number nd of times of violation detection monitored by the terminal disorder frequency monitoring circuit 105 with the third threshold value (Nthw) read out from the memory 801. If the relation $nd \geq Nthw$ holds true, the comparator 802 outputs a violation notification signal S5'. The above described violation notification signal S5' is inputted to the user-terminal regulation circuit 108 via an OR circuit 803. In addition, the violation notification signal S5' is also stored in a flag (Fd) storage area relating to user-terminal regulation provided in the memory 801. The flag Fd is provided to indicate that a steady disorder is found and hence packet regulation is necessary. The flag Fd is so stored in the above described memory 801 together with the threshold value Nthw as to be associated with each LC. Whenever a cell arrives at the input line 11, the flag Fd is read out from the memory 801. The logical sum of this Fd and the above described violation notification signal S5′ outputted from the comparator 802 is supplied to the user-terminal regulation circuit 108 as the violation notification signal S5.

In the same way as the cell discard circuit 107, the user-terminal regulation circuit 108 includes two registers 712 and 714 connected in cascade to the input line 11*i*, a register 711 for storing a bit pattern indicating that the cell is an empty cell, and a selection circuit 713. When the terminal disorder notification circuit 106 outputs the violence notification signal S5, the selection circuit 713 selects the output signal of the register 711 to change the bit pattern of the empty cell indication field of the arrival cell into a bit pattern indicating an empty cell. Packets thus transformed into empty cells are discarded in the switch 1.

Figure 6:
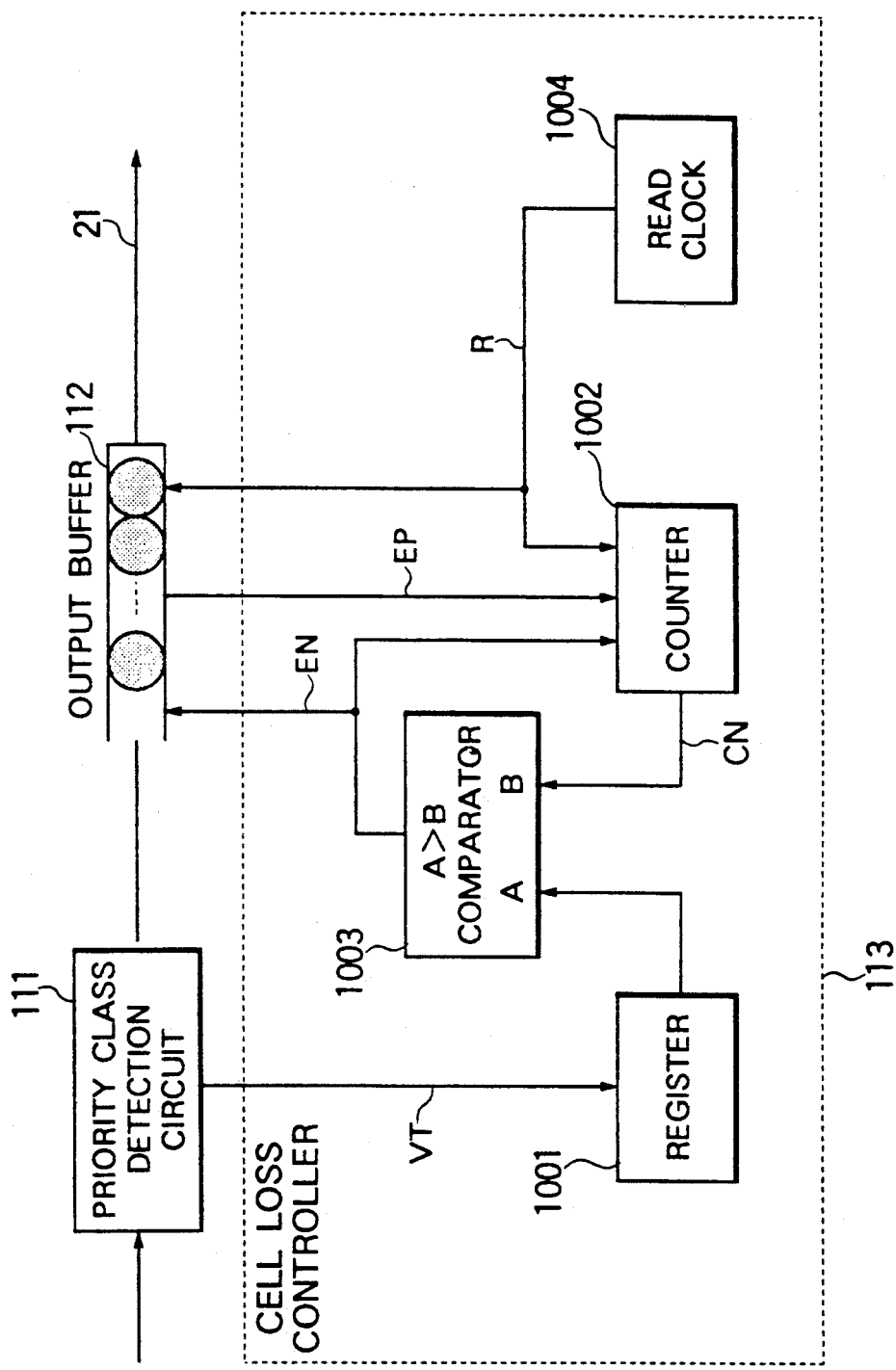
FIG. 6 is a block diagram showing details of a cell loss ratio control circuit 113 illustrated in FIG. 2.

By referring to FIG. 6, details of the priority control circuit 41 will now be described.

The priority control circuit 41 includes the priority class detector 111 for detecting marked cells contained in cells outputted to the output line 21 by the packet switch 1, the output buffer memory 112, and the cell loss ratio control circuit 113.

Marked cells and normal cells are stored in the same output buffer memory 112. If the number of marked cells increases, therefore, there is a possibility of degradation of the quality (such as cell loss ratio and delay time in buffer) of normal cells under the influence thereof. When the number of cells in the above described output buffer memory 112 exceeds a predetermined value resulting in a congestion state, the cell loss ratio control circuit 113 discards marked cells arriving at the output buffer memory thereafter. Thereby a buffer area for normal cells arriving thereafter is secured, and degradation of quality of service using normal cells is prevented.

When the number of cells stored in the output buffer memory exceeds a threshold value Qth, for example, congestion is judged to have occurred. Until the congestion is removed, marked cells arriving thereafter are not stored in the buffer memory but discarded. Assuming that the total number of cells which can be accommodated in the buffer memory 112 is Q, the value of the threshold Qth is so set as to be in the range Qth<Q.

The cell loss ratio control circuit 113 includes a register 1001 for storing the above described threshold value Qth and Q, a counter 1002 for counting the number (CN) of cells stored in the buffer memory, a comparator 1003, and a cell read clock generation circuit 1004.

If the decision output signal Vt supplied from the priority class detector 111 indicates arrival of a marked cell, the threshold value register 1001 outputs the threshold value Qth. If the decision output signal indicates arrival of a normal cell, the threshold value register 1001 outputs the threshold value Q.

The comparator 1003 compares the output value CN of the cell counter 1002 with the output value of the threshold value register 1001. While the relation, CN < threshold value, holds true, the comparator 1003 supplies an enable signal EN to the output buffer memory 112 whenever a cell arrives. As a result, arrival cells are successively stored in the buffer memory 112. When the relation, CN ≧ threshold value, holds true, the above described enable signal EN is not generated and hence arrival cells are discarded.

The above described enable signal EN is supplied to the cell counter 1002 as well. Whenever the enable signal is inputted, the value in the cell counter is increased by 1.

The cell read clock generation circuit 1004 generates a read signal R at periods of one unit time (ut). The above described read signal R is supplied to the output buffer memory 112 and the cell counter 1002. Cells stored in the buffer memory 112 are read in synchronism with the above described read signal R one after another. In synchronism with this read operation, the count in the counter 1002 is decreased one by one. When the number of cells in the buffer is zero, the above described output buffer memory 112 outputs a signal EP indicating the empty buffer state. While the signal EP indicating the empty buffer state is being outputted, the cell counter 1002 stops the above described count operation.

Figure 7:
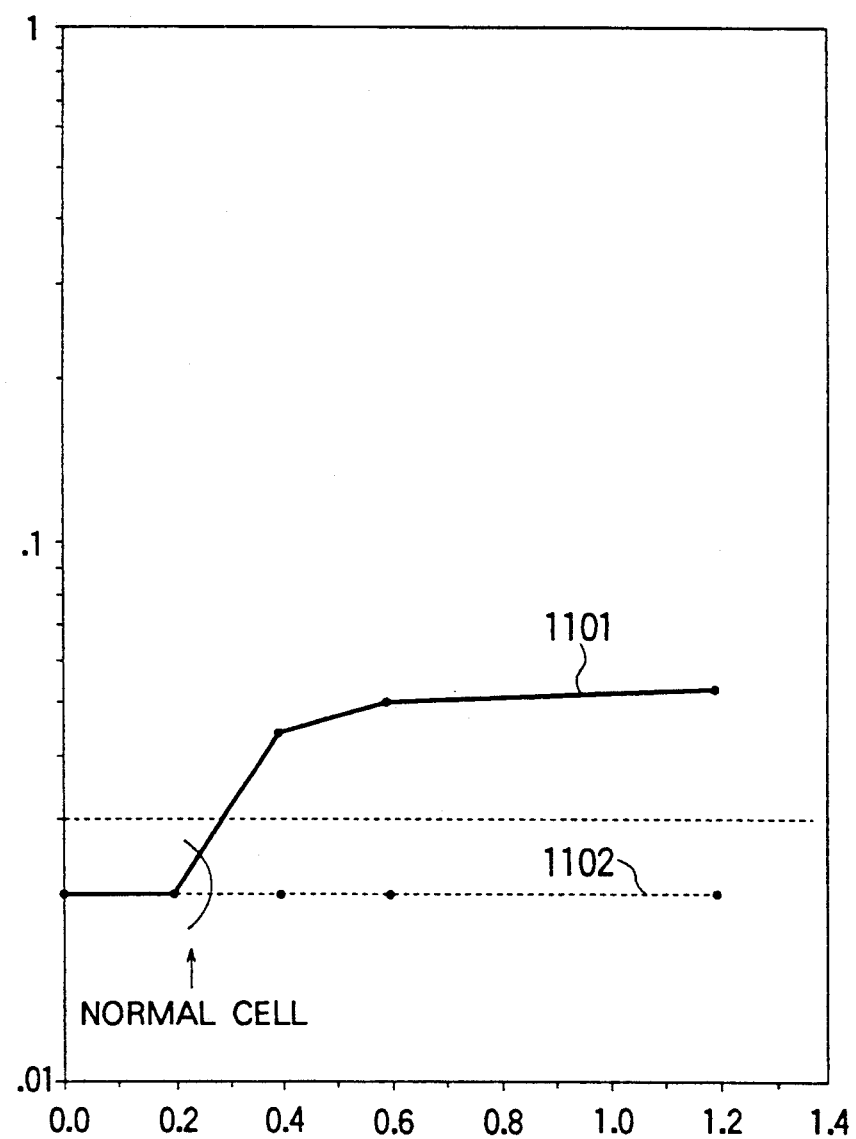
FIG. 7 is a diagram for describing the effect of the present invention viewed from the relation between the cell loss rate and arrival rate of violation cell.

FIG. 7 shows the result of computer simulation relating to the quality of service (cell loss ratio) using normal cells in case the above described cell-rate control according to the present invention is applied. It is now assumed that normal cells and violation cells mixedly arrive from n input lines 1*l*-1*n* shown in FIG. 2 and they are outputted to n output lines.

In FIG. 7, the abscissa represents the rate of arrival of violation cells, which are directed to one output line 21, at the input lines 1*l*-1*n*. However, the arrival rate is normalized by the communication capacity (=156 Mbss) of the output line 21. The ordinate represents the loss ratio of normal cells in the output buffer memory 112. A solid line 1101 represents the cell loss ratio obtained when the method, whereby all marked cells are received and cell discard is not performed at all on the input side, (hereafter referred to as prior art method) is used. A broken line 1102 represents the cell loss ratio obtained when cells are discarded in the packet-rate controller 3*l*-3*n* according to the present invention. In this embodiment, user declaring parameters are supposed to be T=1000 and X=400 and parameters are set as m=1.25 and k=1. Also, it is supposed that the rate of arrival of normal cells at the output buffer memory is 0.8 and the size of the output buffer memory 112 is 8 cells per line. If the number of empty buffers (cells) is 4 or less, congestion is judged to have occurred and marked cells are discarded.

If the prior art method is used and the arrival rate of violation cells becomes at least 0.4, the loss ratio of normal cells is doubled as compared with the case where the arrival rate is 0.0. This is because violation cells are accepted as marked cells with no restriction and the output buffer memory which originally should be used by normal cells is occupied by violation cells, resulting in a congestion state. Meanwhile, in the present invention method, the number of violation cells arriving at the output buffer memory is limited on the input line side of the packet switch. Even if the arrival rate of violation cells on the input line increases, therefore, congestion does not occur in the output buffer memory. As a result, the loss ratio of normal cells is not degraded. In the above described simulation, as many violation cells as 25% of the user-declaring parameters are received into the network as marked cells, resulting in effective use of resources included in the network.

It is understood from this example that owing to the present invention the loss ratio of normal cells is not degraded even if a disorder occurs in a terminal and the arrival rate of violation cells increases. If it is supposed that m=1.25, for example, as many cells as user-declaring parameters increased by 25% can be received into the network. It is understood that the number of cells received into the network can be controlled by changing the magnitude of m.

Further, in case the terminal disorder frequency is high in some terminal, a disorder is considered to have occurred and occurrence of a disorder can be transferred to the call controller. By communication from the call controller to the terminal side, therefore, it is possible to make the subscriber suspend transmission of violation cells. It is thus possible to prevent continuation of the violation cell transmission state for a long time. Further, when the terminal disorder frequency is high, all cells arriving from that terminal are discarded. As a result, it is possible to prevent invasion of a large quantity of violation cells into the network which would occur until the subscriber notices the disorder and suspends the cell transmission.

I claim:

1. A packet-rate control method for a packet communication network, in which a declaration of parameters including the rate of transmitted packets is so made to a call control system by a subscriber terminal device prior to communication as to be associated with a logical channel number, said packet-rate control method comprising the steps of:

monitoring, in association with a logic channel number, a packet rate of packets arriving at the network, said packet rate indicating the number of packets arriving at the network within a predetermined unit of time, when said packet rate exceeds a first threshold value determined on the basis of user-declared parameters, adding a predetermined mark to surplus arrival packets arriving at the network within said predetermined unit of time and taking said surplus arrival packets into the network;

discarding said surplus arrival packets before adding said predetermined mark, when said packet rate exceeds a second threshold value determined on the basis of user-declared parameters, said second threshold value being higher than said first threshold value; and adjusting said packet rate in the network by discarding packets provided with said predetermined mark, when congestion has occurred in the network.

2. A packet-rate control method for a packet communication network, in which a declaration of parameters including the rate of transmitted packets is so made to a call control system by a subscriber terminal device prior to communication as to be associated with a logical channel number, comprising the step of:

monitoring, in association with a logic channel number, the rate of packets which have arrived at said packet communication network and, upon an excess of said packet rate over a first threshold value determined on the basis of user-declared parameters, adding a predetermined mark to surplus arrival packets and taking said surplus arrival packets into the network;

discarding a part of said surplus arrival packets when the rate of packets exceeds a second threshold value determined on the basis of user-declared parameters, said second threshold value being higher than said first threshold value;

transmitting a signal for notifying disorder occurrence from said call control system to a subscriber terminal device, which have transmitted said discarded surplus arrival packet, when the discard rate of said arrival packets discarded due to the excess of said second threshold value exceeds a third threshold value; and adjusting the rate of packets in said communication network by discarding packets provided with said predetermined mark, when congestion has occurred in said network.

3. A packet-rate control method for a packet communication network, in which a declaration of parameters indicating the rate of fixed-length packets is so made to a call control system of said network by a subscriber terminal device prior to communication as to be associated with a logical channel number, said packet-rate control method comprising the steps of:

monitoring, in association with a logic channel number, an arrival rate of packets arriving at said network, said arrival rate indicates the number of packets arriving at said network within a predetermined unit of time, and judging a degree of violation of user-declared parameters based on said arrival rate;

adding a mark indicating violation to surplus packets and receiving said surplus packets provided with said mark in the network when said degree of violation of user-declared parameters is lower than a predetermined reference value; and discarding surplus packets arriving at said network within said predetermined unit of time from a terminal which has violated said user-declared parameters on the input side of the packet network when said degree of violation of the user-declared parameters is higher than said predetermined reference value.

4. A packet-rate control method according to claim 3, further comprising the steps of:

monitoring a violation frequency of user-declared parameters in association with a logic channel number by counting the number of time periods in which discard of surplus packets has occurred; and when said monitored violation frequency exceeds said user-declared parameters by a predetermined reference value, discarding all surplus packets arriving thereafter from the terminal on the input side of the packet network.

5. A packet-rate control method according to claim 4, further comprising the step of notifying the terminal violating the user-declared parameters of disorder occurrence when said monitored violation frequency of user-declared parameters has exceeded said predetermined reference value.

6. A packet-rate control system for a packet network, comprising:

means for storing, in association with a logic channel number, user-declared parameters indicating a rate of transmitted packets declared to the packet network by a subscriber terminal device prior to communication with another device;

means for monitoring a rate of arrival of packets in association with a logic channel number and detecting packets arriving with a rate exceeding a first threshold rate determined by said user-declared parameters;

means for adding a predetermined identification mark to excess packets which have arrived with a rate exceeding said first threshold rate; and means for discarding all excess packets which have arrived with a rate exceeding a second threshold rate, said second threshold rate being larger than said first threshold rate indicated by said user-declared parameters.

7. A packet-rate control apparatus according to claim 6, further comprising:

means for detecting a disorder of a subscriber terminal device on the basis of the discard rate of excess packets; and means for discarding all packets arriving thereafter from the subscriber terminal device wherefrom the disorder of said subscriber terminal has been detected.

8. A packet-rate control apparatus according to claim 7, further comprising:

means for transmitting a signal notifying a disorder occurrence to the subscriber terminal device when said detecting means detects the disorder of said subscriber terminal.

* * * * *